US011885151B2

(12) United States Patent
Balasubramaniam et al.

(10) Patent No.: US 11,885,151 B2
(45) **Date of Patent: *Jan. 30, 2024**

(54) KEYCAM ASSEMBLY

(71) Applicant: Schlage Lock Company LLC, Carmel, IN (US)

(72) Inventors: Pradeepkumar Balasubramaniam, Tiruppur District (IN); Harikrishnan Mannattil, Malappuram District (IN); Sundar Raj Dore Vasudevan, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,191

(22) Filed: Mar. 22, 2022

(65) Prior Publication Data

US 2023/0009258 A1 Jan. 12, 2023

Related U.S. Application Data

(63) Continuation of application No. 16/269,912, filed on Feb. 7, 2019, now Pat. No. 11,280,109.

(51) Int. Cl.

| | |
|---|---|
| ***E05B 13/00*** | (2006.01) |
| ***E05B 15/00*** | (2006.01) |
| ***E05B 55/00*** | (2006.01) |

(52) U.S. Cl.

CPC ........ *E05B 13/004* (2013.01); *E05B 15/0033* (2013.01); *E05B 55/005* (2013.01); *E05Y 2900/132* (2013.01)

(58) Field of Classification Search

CPC ........ E05B 13/00; E05B 13/004; E05B 15/00; E05B 15/0033; E05B 55/00;

(Continued)

(56) References Cited

U.S. PATENT DOCUMENTS

| | | | |
|---|---|---|---|
| 5,441,318 | A | 8/1995 | Ghostley |
| 5,794,472 | A | 8/1998 | Kester et al. |

(Continued)

FOREIGN PATENT DOCUMENTS

| | | | |
|---|---|---|---|
| WO | 2004015229 | A2 | 2/2004 |

OTHER PUBLICATIONS

International Search Report; International Searching Authority; International Application No. PCT/US2020/017251; dated Aug. 10, 2020; 3 pages.

(Continued)

*Primary Examiner* — Nathan Cumar

(74) *Attorney, Agent, or Firm* — Taft Stettinius & Hollister LLP

(57) ABSTRACT

A keycam assembly including a rotatable member, a stem, a locking member coupled to the stem for joint longitudinal movement therewith, and a cam driver. The rotatable member includes an aperture. A proximal end portion of the stem is rotatably seated in the rotatable member and defines a cam track. The locking member extends between the aperture and the cam track. The cam track includes a first passage including a locking pocket, a second passage including an unlocking pocket, a first ramped passage including a locking ramp extending from the second passage to the locking pocket, and a second ramped passage including an unlocking ramp extending from the first passage to the unlocking pocket. Relative rotation of the rotatable member and the stem causes the cam driver to travel along the track to thereby cause movement of the locking member between a locking position and an unlocking position.

19 Claims, 6 Drawing Sheets

(58) Field of Classification Search

CPC ............... E05B 55/005; E05Y 2900/00; E05Y 2900/132; E05Y 2900/134; E05Y 2900/136; E05Y 2900/14

USPC .......................................................... 292/140

See application file for complete search history.

(56) References Cited

U.S. PATENT DOCUMENTS

| | | | | |
|---|---|---|---|---|
| 5,934,117 | A | 8/1999 | Shen | |
| 6,189,351 | B1 | 2/2001 | Eagan et al. | |
| 6,705,138 | B1 | 3/2004 | Shen | |
| 8,844,330 | B2 * | 9/2014 | Moon | E05B 13/04 292/336.3 |
| 2013/0239631 | A1 | 11/2013 | Moon et al. | |
| 2015/0013402 | A1 | 1/2015 | Murphy | |
| 2015/0315816 | A1 * | 11/2015 | Gopalakrishnan | E05B 63/06 70/344 |
| 2017/0342740 | A1 * | 11/2017 | Basavaraju | E05B 41/00 |
| 2018/0058117 | A1 | 3/2018 | Ou et al. | |
| 2018/0187451 | A1 | 7/2018 | Cohen et al. | |

OTHER PUBLICATIONS

Written Opinion of the International Searching Authority, International Searching Authority; International Application No. PCT/US2020/017251; dated Aug. 10, 2020; 7 pages.

Canadian Examination Report; Canadian Intellectual Property Office; Canadian Patent Application No. 3,129,670; dated Nov. 23, 2022; 4 pages.

Canadian Examination Report; Canadian Intellectual Property Office; Canadian Patent Application No. 3,129,670; dated Aug. 23, 2023; 3 pages.

* cited by examiner

KEYCAM ASSEMBLY

CROSS REFERENCE TO RELATED APPLICATIONS

This application is a continuation of U.S. patent application Ser. No. 16/269,912 filed Feb. 7, 2019 and issued as U.S. Pat. No. 11,280,109, the contents of which are hereby incorporated herein by reference in their entirety.

TECHNICAL FIELD

The present disclosure generally relates to door locks, and more particularly but not exclusively relates to cylindrical format locksets of a classroom security function.

BACKGROUND

Cylindrical format locksets are commonly provided with different functions to provide doors with different locking and unlocking characteristics. In passage function locksets, for example, both the inside handle and the outside handle are always unlocked, whereas privacy function locksets include a button or turnpiece on the inside trim by which the outside handle can be selectively locked. One function that has gained popularity in recent years is the classroom security function. Locksets of the classroom security function include lock cylinders on both the inside trim and the outside trim, and each of the lock cylinders is operable to lock and unlock the outside handle.

One issue that has arisen in connection with cylindrical locksets is a type of tampering or attack in which the handles are twisted in opposite directions. In many conventional locksets, this type of attack places significant strain on the internal working components of the lockset, and can lead to permanent damage of the lockset. While several functions of conventional locksets are susceptible to this type of attack, locksets of the classroom security function have been found to be particularly susceptible to the attack due to the complexity of the mechanisms that enable each lock cylinder to selectively lock the outside handle. For these reasons among others, there remains a need for further improvements in this technological field.

SUMMARY

An exemplary keycam assembly includes a rotatable member, a stem, a locking member coupled to the stem for joint longitudinal movement therewith, and a cam driver. The rotatable member includes an aperture. A proximal end portion of the stem is rotatably seated in the rotatable member and defines a cam track. The locking member extends between the aperture and the cam track. The cam track includes a first passage including a locking pocket, a second passage including an unlocking pocket, a first ramped passage including a locking ramp extending from the second passage to the locking pocket, and a second ramped passage including an unlocking ramp extending from the first passage to the unlocking pocket. Relative rotation of the rotatable member and the stem causes the cam driver to travel along the track to thereby cause movement of the locking member between a locking position and an unlocking position. Further embodiments, forms, features, and aspects of the present application shall become apparent from the description and figures provided herewith.

DETAILED DESCRIPTION OF ILLUSTRATIVE EMBODIMENTS

Figure 1:
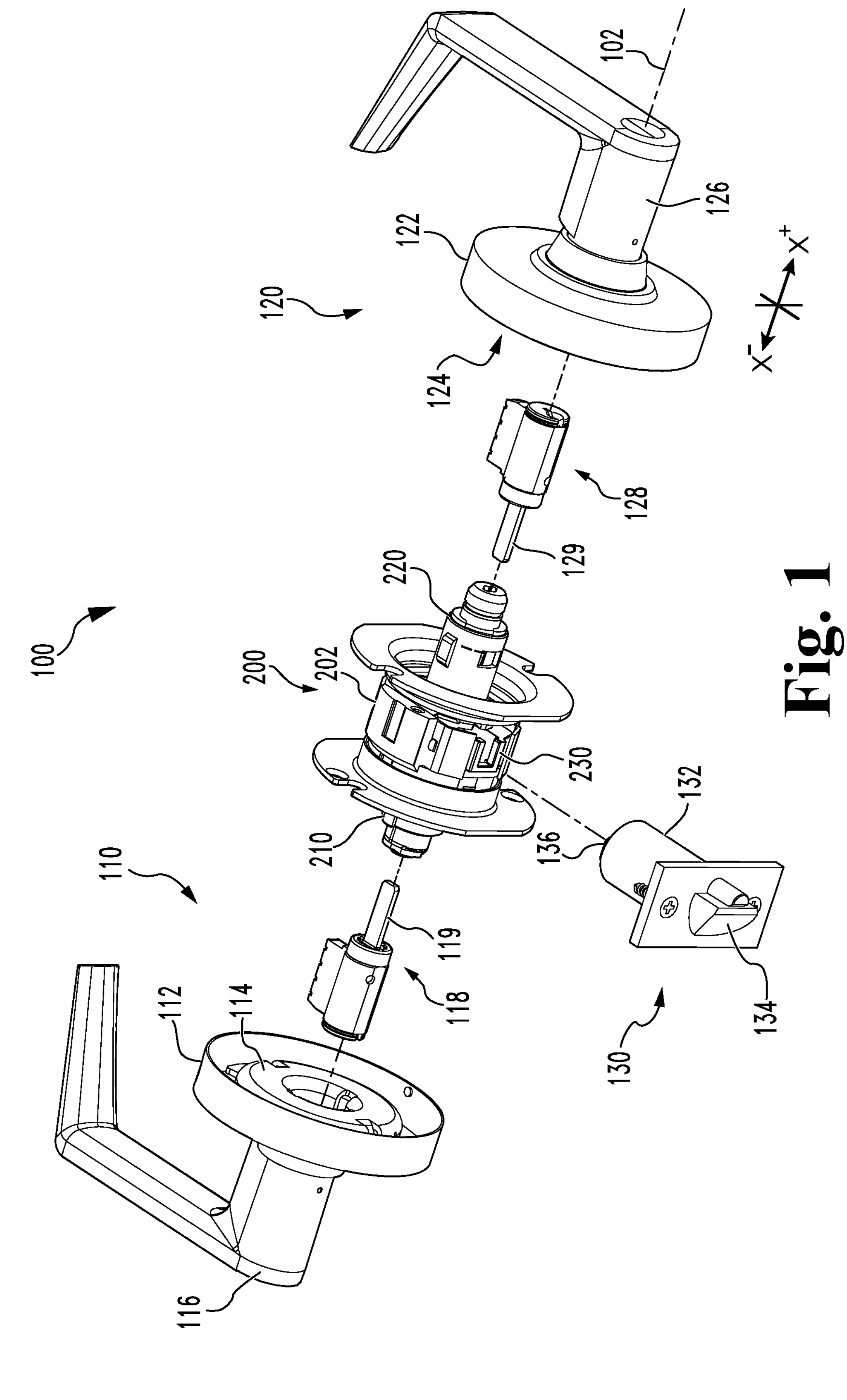
FIG. 1 is an exploded assembly view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. The directions defined by each axis may be referred to as positive and negative directions, wherein the arrow of the axis indicates the positive direction. In the coordinate system illustrated in FIG. 1, the X-axis defines first and second longitudinal directions, which may be referred to as "proximal" ($X^-$) and "distal" ($X^+$). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, illustrated therein is a cylindrical lockset 100 according to certain embodiments. The lockset 100 includes an outside trim 110 configured for mounting to the outer or unsecured side of a door, an inside trim 120 configured for mounting to the inner or secured side of a door, a latchbolt mechanism 130 configured for mounting in a lateral bore of the door, and a chassis 200 configured for mounting in a cross-bore connected with the lateral bore. As described herein, the chassis 200 connects the outside trim 110 and the inside trim 120 with the latchbolt mechanism 130 such that each trim 110, 120 is at least selectively operable to actuate the latchbolt mechanism 130 to enable opening of the door. The lockset 100 has a central longitudinal axis 102 about which various components of the lockset 100 rotate or pivot. The longitudinal axis 102 defines a proximal direction ($X^-$) and an opposite distal direction ($X^+$).

The outside trim 110 includes an outside spring cage 112, an outside drive spindle 114 rotatably mounted to the outside spring cage 112, an outside handle 116 mounted to the spindle 114 for joint rotation therewith, and an outside lock cylinder 118 that is mounted within the handle 116, and which includes an outside tailpiece 119 that extends along the longitudinal axis 102. Similarly, the inside trim 120 includes an inside spring cage 122, an inside drive spindle 124 rotatably mounted to the inside spring cage 122, an inside handle 126 mounted to the spindle 124 for joint rotation therewith, and an inside lock cylinder 128 that is mounted within the handle 126, and which includes an inside tailpiece 129 that extends along the longitudinal axis 102. In the illustrated form, each of the handles 116, 126 is provided in the form of a lever. It is also contemplated that one or both of the handles 116, 126 may be provided in another form, such as that of a knob.

The latchbolt mechanism 130 includes a housing 132, a latchbolt 134 movably mounted in the housing 132, and a bolt bar 136 operably connected with the latchbolt 134. The latchbolt 134 has an extended position and a retracted position, and is biased toward the extended position. The bolt bar 136 connects the latchbolt 134 to the chassis 200 such that the chassis 200 is operable to drive the latchbolt 134 from the extended position to the retracted position.

Figure 2A:
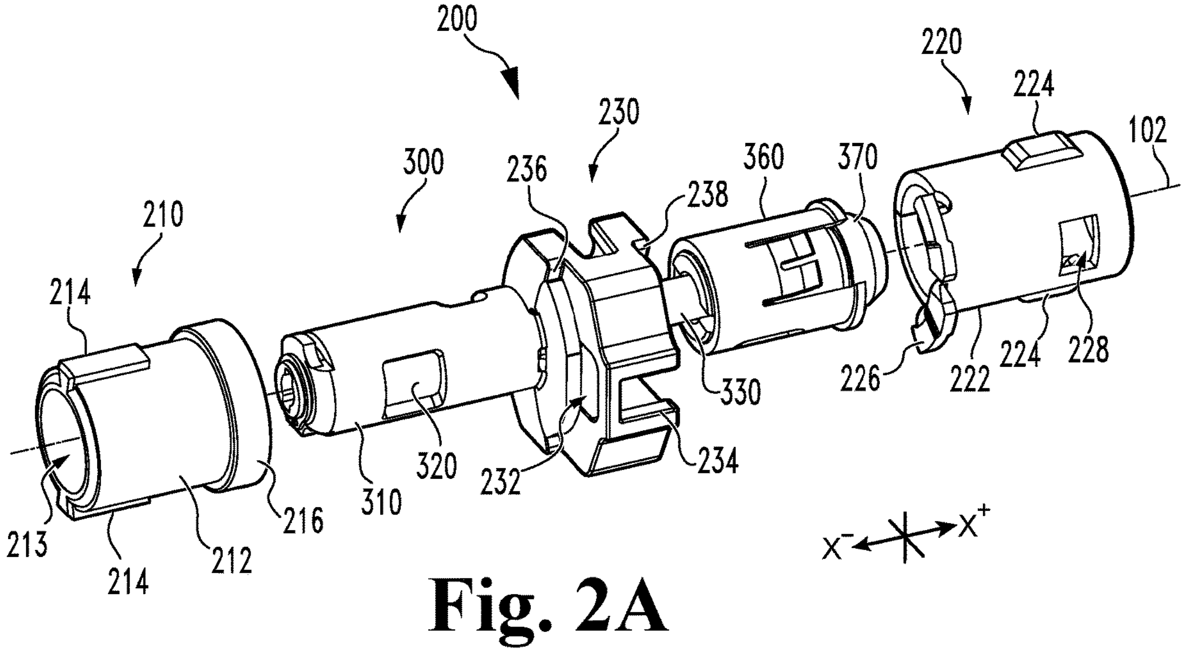
FIGS. 2A and 2B are exploded assembly views of a chassis of the lockset illustrated in FIG. 1.
Figure 2B:
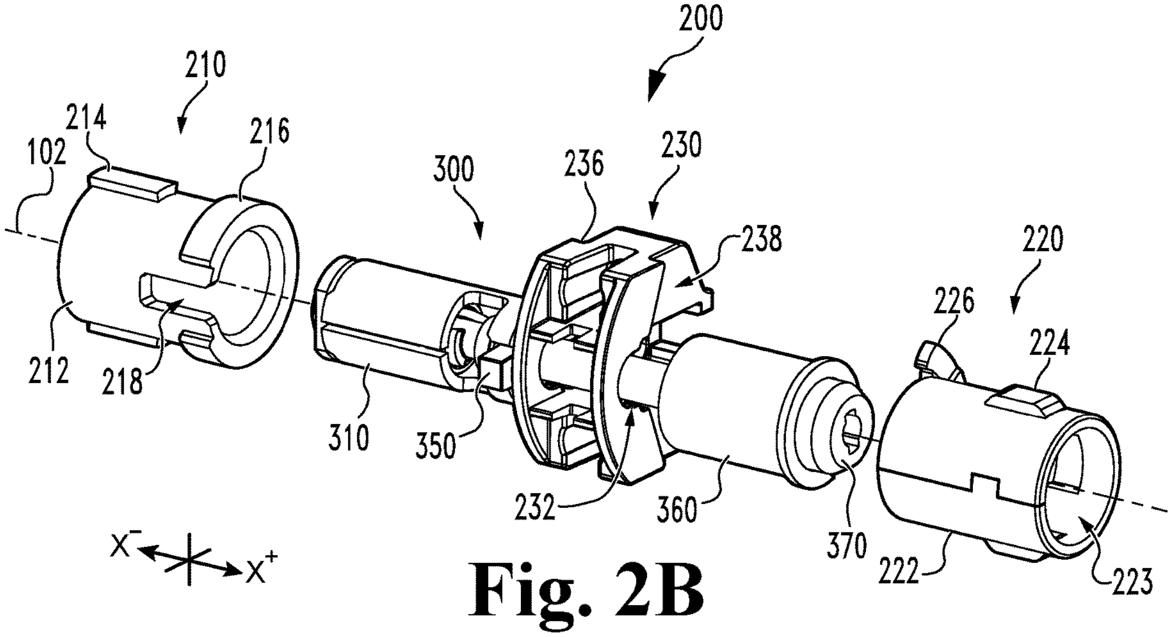

With additional reference to FIGS. 2A and 2B, the chassis 200 includes a housing 202, an outside chassis spindle 210 rotatably mounted to the housing 202, an inside chassis spindle 220 rotatably mounted to the housing 202, a shuttle 230 slidably mounted to the housing 202, and a keycam assembly 300 that extends through the shuttle 230 and is engaged with each of the spindles 210, 220. The shuttle 230 biased toward a home position and is coupled with the bolt bar 136 such that movement of the shuttle 230 to a retracted position causes a corresponding retraction of the latchbolt 134. As described herein, the outside chassis spindle 210 is selectively operable to retract the shuttle 230, and the inside chassis spindle 220 is at all times operable to retract the shuttle 230. As such, the outside handle 116 can be selectively locked against retracting the latchbolt 134, whereas the inside handle 126 can always retract the latchbolt 134 to provide for free egress.

The outside chassis spindle 210 is rotationally coupled with the outside drive spindle 114 such that the outside handle 116 is operable to rotate the outside chassis spindle 210. The outside chassis spindle 210 generally includes a cylindrical body portion 212 defining a chamber 213 therein, a pair of splines 214 formed on a proximal end of the body portion 212, a collar 216 formed on the distal end of the body portion 212, and a longitudinal receiving slot 218 extending from the distal end of the spindle 210. The splines 214 are seated in a pair of slots defined by the outside drive spindle 114, thereby rotationally coupling the spindles 114, 210 with one another.

The inside chassis spindle 220 is rotationally coupled with the inside drive spindle 124 such that the inside handle 126 is operable to rotate the inside chassis spindle 220. The inside chassis spindle 220 generally includes a cylindrical body portion 222 defining a chamber 223 therein, a pair of splines 224 formed on the body portion 222, a flange 226 extending radially outward from a proximal end of the body portion 222, and a coupling opening 228 formed in a distal end portion of the spindle 220. The splines 224 are seated in a pair of slots defined by the inside drive spindle 124, thereby rotationally coupling the spindles 124, 220 with one another.

The shuttle 230 generally includes a central opening 232 through which the keycam assembly 300 extends, a coupling opening 234 at which the shuttle 230 is connected to the bolt bar 136, a pair of proximal ramps 236 formed on the proximal side of the shuttle 230, and a pair of distal ramps 238 formed on a distal side of the shuttle 230. The proximal ramps 236 are engaged with a flange 315 defined by the key cam assembly 300 such that rotation of the flange 315 in either direction causes retraction of the shuttle 230. Similarly, the distal ramps 238 are engaged with the flange 226 of the inside chassis spindle 220 such that rotation of the inside chassis spindle 220 in either direction causes retraction of the shuttle 230.

Figure 3A:
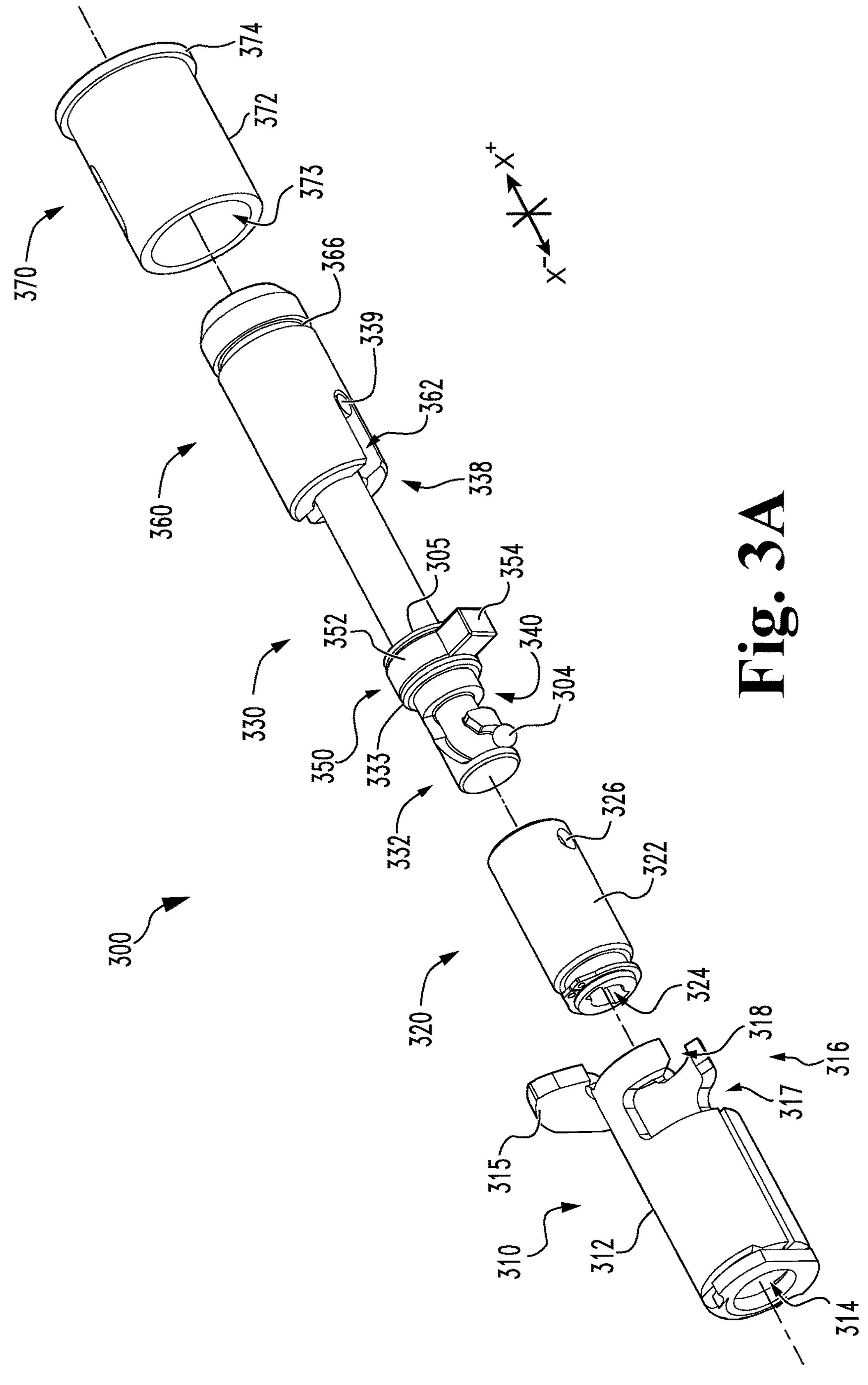
FIGS. 3A and 3B are exploded assembly views of a keycam assembly of the chassis illustrated in FIGS. 2A and 2B.
Figure 3B:
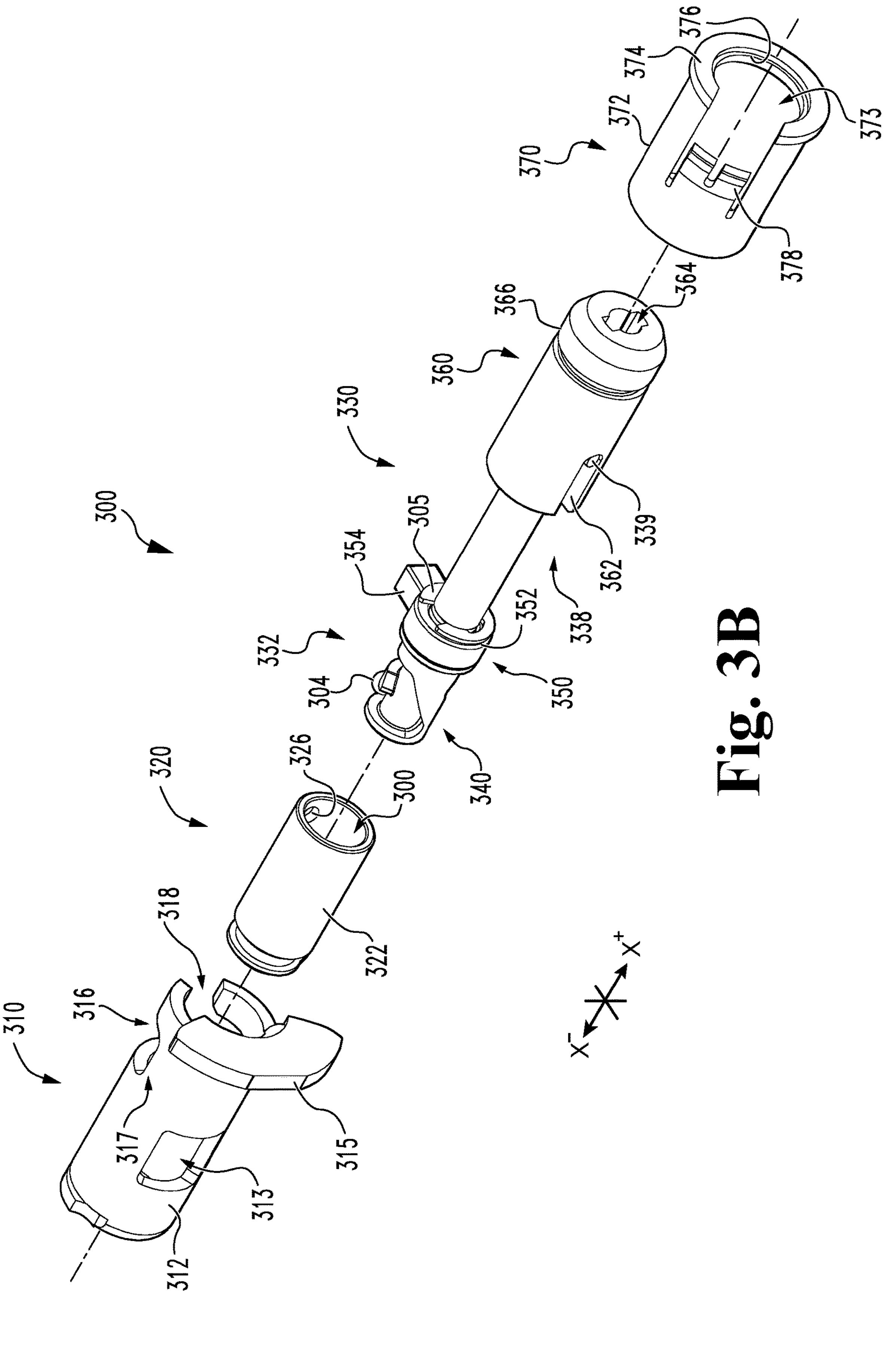

With additional reference to FIGS. 3A and 3B, the keycam assembly 300 extends along the longitudinal axis 102, and generally includes a first or outside shell 310 rotatably seated in the outside chassis spindle 210, a first or outside plug 320 rotatably seated in the outside shell 310, a stem 330 extending through the shuttle 230 and defining a cam track 340 in a proximal end portion 332 thereof that extends about a ridge 334, a cam driver 304 seated in the track 340, a lock control lug 350 rotatably mounted to the stem 330 adjacent the cam track 340, a second or inside plug 360 slidably mounted to a distal end portion 338 of the stem 330, and a second or inside shell 370 that is mounted in the inside chassis spindle 220 and which has the inside plug 360 rotatably mounted therein. As described herein, the keycam assembly 300 selectively prevents the outside chassis spindle 210 from retracting the shuttle 230, and facilitates rotation of the handles 116, 126 in opposite directions to prevent damage to the chassis 200.

The outside shell 310 is rotatably seated in the chamber 213 of the outside chassis spindle 210, and generally includes a body portion 312 defining a chamber 313, a proximal opening 314 through which the outside tailpiece 119 extends to engage the outside plug 320, a flange 315 extending radially outward from a distal end of the body portion 312, and a lock control opening 316 including a partial circumferential locking slot 317 and an unlocking slot 318 extending distally from the locking slot 317. The locking slot 317 may alternatively be referred to herein as the arc slot 317, and the unlocking slot 318 may alternatively be referred to herein as the longitudinal slot 318. The flange 315 is engaged with the proximal ramps 236 of the shuttle 230 such that rotation of the outer shell 310 in either direction causes retraction of the shuttle 230. As described in further detail below, the lock control lug 350 extends through the lock control opening 316 and into the receiving slot 218 of the outside chassis spindle 210, and the lug 350 and the opening 316 cooperate to selectively rotationally couple the outside shell 310 with the outside drive spindle 210.

The outside plug 320 is rotatably seated in the chamber 313 of the outside shell 310 and is longitudinally coupled with the outside shell 310. The outside plug 320 includes a body portion 322 defining a chamber 323, a proximal end portion defining a receiving slot 324, and a distal end portion defining an aperture 326 in communication with the chamber 323. The outside tailpiece 119 extends into the receiving slot 324 such that the outside lock cylinder 118 is operable to rotate the outside plug 320.

The stem 330 extends through the central opening 232 of the shuttle 230, and is rotatably supported by the outside plug 320 and the inside plug 360. A proximal end portion 332 of the stem 330 defines the track 340, and has the lock control lug 350 rotatably mounted thereon. The proximal end portion 332 includes a shoulder 333 that abuts the lock control lug 350, and a ridge 334 that partially defines the track 340. A distal end portion 338 of the stem 330 extends into the inside plug 360, and has a coupling pin 339 mounted thereto.

Figure 4A:
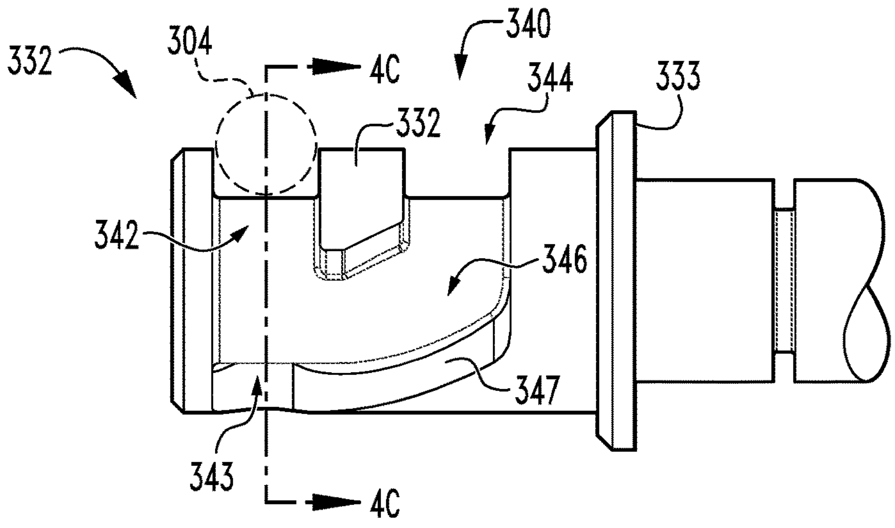
FIGS. 4A and 4B are plan views of a stem of the keycam assembly illustrated in FIGS. 3A and 3B.
Figure 4B:
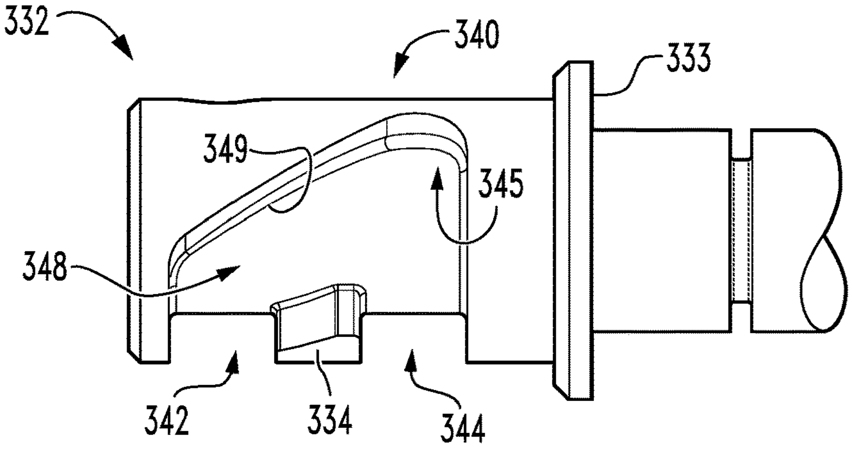
Figure 4C:
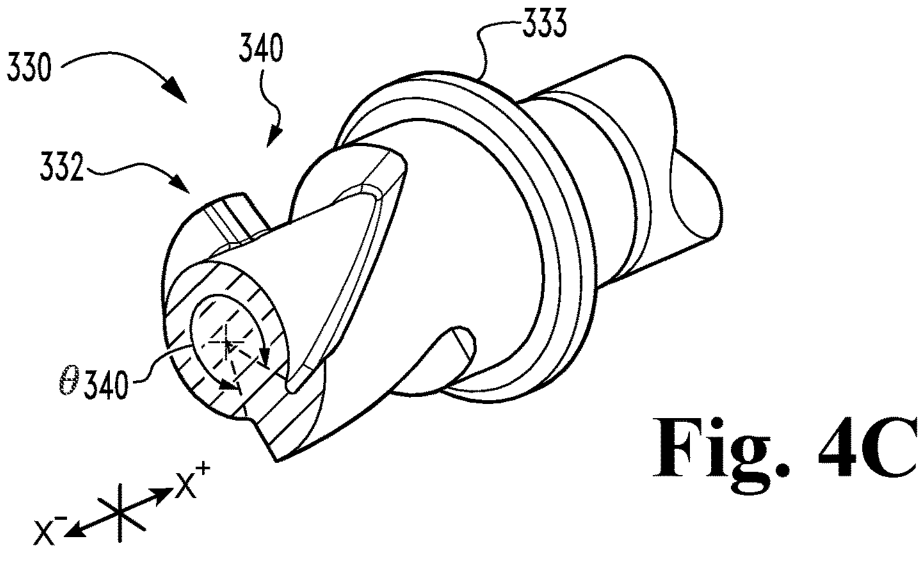
FIG. 4C is a perspective cutaway view of the stem illustrated in FIGS. 4A and 4B.

With additional reference to FIGS. 4A through 4C, the cam track 340 has the driver 304 mounted therein, and generally includes a proximal passage 342, a distal passage 344, and a pair of ramped passages 346, 348 connecting the proximal passage 342 and the distal passage 344. The proximal passage 342 includes a proximal pocket 343 adjacent the first ramped passage 346, and the distal passage 344 includes a distal pocket 345 adjacent the second ramped passage 348. Each of the pockets 343, 345 is sized and shaped to receive the cam driver 304. The first ramped passage 346 includes a first ramp 347 that leads from the distal passage 344 to the proximal pocket 343, and the second ramped passage 348 includes a second ramp 349 that leads from the proximal passage 342 to the distal pocket 345. Each of the proximal passage 342 and the distal passage 344 has an angular span θ340 that exceeds 180°. In certain embodiments, the angular span θ340 exceeds 270°.

The cam driver 304 is movably seated in the track 340 and is operable to move within the track 340. The depth of the cam track 340 is less than the height of the cam driver 304 such that the cam driver 304 extends beyond the radially outer surface of the proximal end portion 332 and into the aperture 326 of the outside plug 320. Accordingly, the cam driver 304 has a fixed position relative to the outside plug 320. As described in further detail below, the cam driver 304 cooperates with the track 340 to cause longitudinal movement of the stem 330 in response to relative rotation of the stem 330 and the outside plug 320. In the illustrated form, the cam driver 304 is provided in the form of a sphere that rolls within the cam track 340. In other embodiments, the cam driver 304 may be provided in the form of a cylinder that slides and/or rolls within the cam track 340.

The lock control lug 350 is rotatably mounted to the stem 330, and includes an annular portion 352 and an arm 354 extending radially outward from the annular portion 352. The annular portion 352 is captured between the shoulder 333 of the stem 330 and a C-clip 305 such that the lug 350 and the stem 330 are coupled for joint longitudinal movement. The arm 354 extends into the receiving slot 218 of the outside chassis spindle 210 via the lock control opening 316. As described herein, the lock control lug 350 selectively couples the outside chassis spindle 210 and the outside shell 310 for joint rotation.

The inside plug 360 is slidably mounted to the stem 330 and is rotatably mounted within the inside shell 370. The proximal end of the inside plug 360 includes a pair of longitudinal slots 362, and the distal end of the inside plug 360 includes a receiving slot 364 and an annular groove 366. The coupling pin 339 is received in the slots 362 such that the stem 330 and the inside plug 360 are coupled for joint rotation while permitting the stem 330 to move longitudinally relative to the plug 360. In other words, the stem 330 and the inside plug 360 are slidably rotationally coupled with one another. The tailpiece 129 of the inside lock cylinder 128 extends into the receiving slot 364 such that the inside lock cylinder 128 is operable to rotate the inside plug 360 to thereby rotate the stem 330.

The inside shell 370 is seated in the inside chassis spindle 220, and generally includes a body portion 372 defining a chamber 373 in which the inside plug 360 is rotatably seated, a distal collar 374, a ridge 376 defined on a radially inner side of the collar 374, and a resilient coupling arm 378 that is flexed radially outward from the body portion 372. The collar 374 abuts a distal end of the inside chassis spindle 220, and the coupling arm 378 extends into the coupling opening 228 such that a portion of the spindle 220 is captured between the arm 378 and the collar 374. As a result, the inside shell 370 is rotationally and longitudinally coupled with the inside chassis spindle 220. The ridge 376 is seated in the annular groove 366 such that the inside plug 360 is longitudinally coupled with the inside shell 370 and is rotationally decoupled from the inside shell 370.

Figure 5:
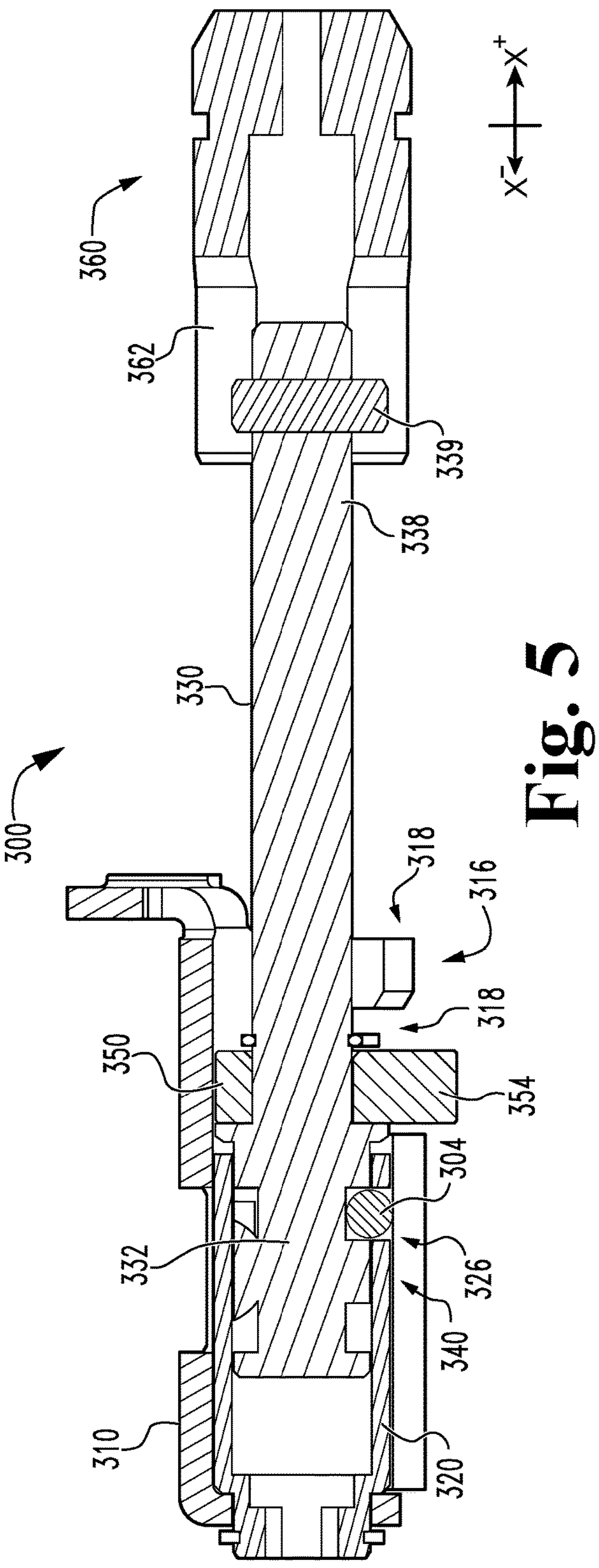
FIG. 5 is a cross-sectional illustration of the keycam assembly in a locking state.
Figure 6:
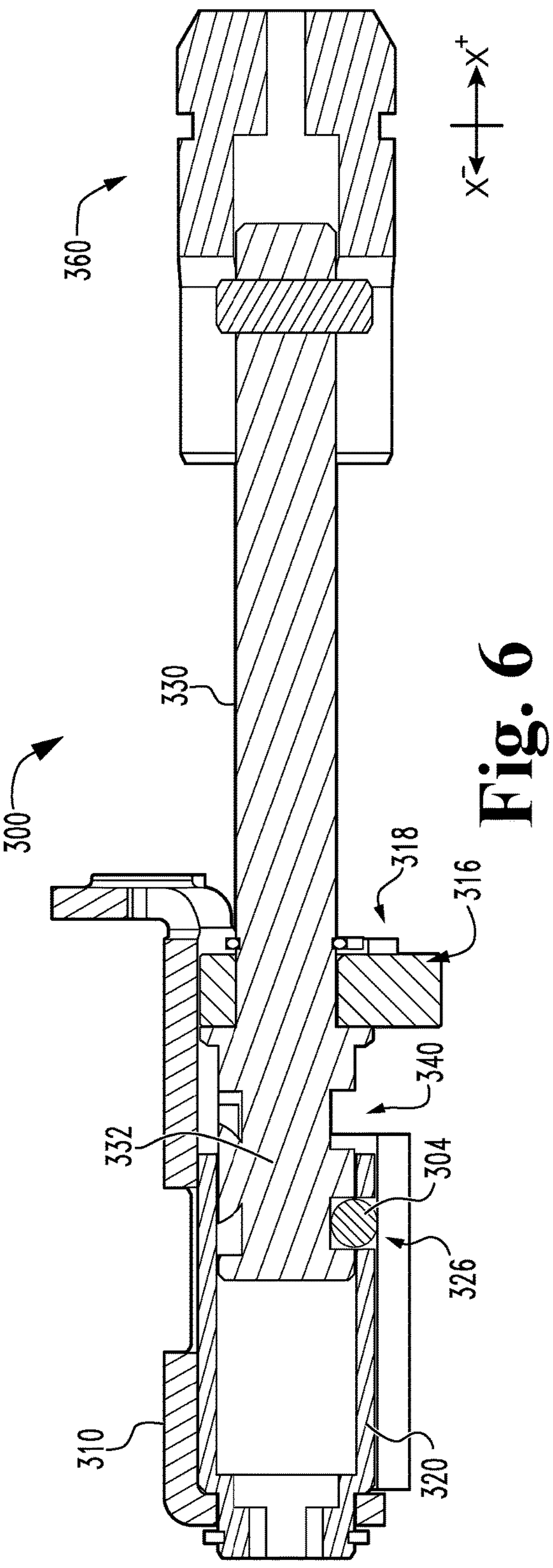
FIG. 6 is a cross-sectional illustration of the keycam assembly in an unlocking state.

With additional reference to FIGS. 5 and 6, the lock control lug 350 has a proximal locking position (FIG. 5) and a distal unlocking position (FIG. 6). In each position, the arm 354 extends into the receiving slot 218 of the outside chassis spindle 210 via the lock control opening 316. With the lug 350 in the locking position, the arm 354 extends into the receiving slot 218 via the arc slot 317 such that the outside chassis spindle 210 is rotationally decoupled from the outside shell 310. As a result, the outside handle 116 is inoperable to rotate the shell 310, and therefore cannot drive the shuttle 230 to retract the latchbolt 134. With the lug 350 in the unlocking position, the arm 354 extends into the receiving slot 218 via the longitudinal slot 318 such that the outside chassis spindle 210 is rotationally coupled with the outside shell 310. As a result, the outside handle 116 is operable to rotate the shell 310, and therefore is capable of driving the shuttle 230 to retract the latchbolt 134. As described herein, each of the lock cylinders 118, 128 is capable of moving the lock control lug 350 between its locking and unlocking positions to lock and unlock the outside handle 116.

During operation, the lock control lug 350 may begin in its locking position (FIG. 5) to define a locked state of the lockset 100, in which the outside handle 116 is inoperable to retract the latchbolt 134. In this state, the driver 304 is located in the distal passage 344 of the cam track 340, for example in the distal pocket 345. As noted above, the driver 304 is also seated in the aperture 326 such that the driver 304 has a fixed position relative to the outside plug 320. Thus, relative rotation of the outside plug 320 and the stem 330 will cause the driver 304 to move within the cam track 340. More particularly, relative rotation of the outside plug 320 and the stem 330 in an unlocking direction will cause the driver 304 to move from the distal pocket 345, along the distal passage 344, and into engagement with the first ramp 347. Upon engaging the first ramp 347, the driver 304 urges the stem 330 in the distal direction, thereby moving the lug 350 toward its unlocking position. As such, the first ramp 347 may alternatively be referred to as the unlocking ramp 347.

With the lock control lug 350 in its unlocking position (FIG. 6), the lockset 100 is in an unlocked state in which the outside handle 116 is operable to retract the latchbolt 134. In this state, the driver 304 is located in the proximal passage 342 of the cam track 340, for example in the proximal pocket. Additionally, relative rotation of the outside plug 320 and the stem 330 in a locking direction opposite the unlocking direction will cause the driver 304 to move from the proximal pocket 343, along the proximal passage 342, and into engagement with the second ramp 349. Upon engaging the second ramp 349, the driver 304 urges the stem 330 in the proximal direction, thereby moving the lug 350 toward its locking position. As such, the second ramp 349 may alternatively be referred to as the locking ramp 349.

As will be appreciated, the above-described relative rotation of the outside plug 320 and the stem 330 can be achieved by operating either of the lock cylinders 118, 128. For example, operating the outside lock cylinder 118 to rotate the outside tailpiece 119 causes a corresponding rotation of the outside plug 210. Similarly, operating the inside lock cylinder 128 to rotate the inside tailpiece 129 causes a corresponding rotation of the inside plug 360, thereby rotating the stem 330. Thus, each of the lock cylinders 118, 128 is operable to transition the lockset 100 between its locked and unlocked states.

Regardless of which lock cylinder 118/128 is utilized to cause relative rotation of the outside plug 320 and the stem 330, it may be necessary to return the lock cylinder 118/128 to its initial position to permit extraction of the key. The key may be rotated 180° to adjust the locked/unlocked state of the lockset 100, and rotated 180° to return the key to the home position in which the key can be extracted. In certain forms, the initial rotation and the subsequent rotation may be in the same direction such that the total rotation of the key is 360°. In other forms, the initial rotation and the subsequent rotation may be in opposite directions such that the subsequent rotation is a return rotation.

During the initial rotation of the key, the driver 304 travels in one of the proximal passage 342 or the distal passage 344 and into the other of the proximal passage 342 or the distal passage 344. As a result, during return rotation of the key, the driver 304 travels along the other of the proximal passage 342 or the distal passage 344, thereby maintaining the longitudinal position of the stem 330 and the lug 350 mounted thereon. Due to the angular span θ340 of each passage 342, 344 exceeding 180° (the amount by which the key is rotated to transition the lockset 100 between the locking and unlocking states), the return rotation does not cause the driver 304 to engage the ramp 347/349 that was not engaged on the initial rotation, and the lockset 100 maintains the locked/unlocked state selected by the initial rotation of the key.

As noted above, one common form of attack on locksets such as the lockset 100 involves torqueing the handles 116, 126 in opposite directions (e.g., pushing the lever of the outside handle 116 upward while pulling the lever of the inside handle 126 downward). While many existing locksets are susceptible to this type of attack, the above-described keycam assembly 300 provides the lockset 100 with a measure of protection against this form of attack. As will be appreciated, rotation of either handle 116/126 causes a corresponding rotation of the tailpiece 119/129 mounted within that handle 116/126, thereby causing relative rotation of the outside plug 320 and the stem 330. The greatest amount of relative rotation that can be achieved by the rotating handles is by rotating the handles 116, 126 in opposite directions, for example by rotating the outside handle 116 upward while rotating the inside handle 126 downward. Even in such a case, however, the maximum relative rotation that can be achieved by rotating the handles is less than 180°. As noted above, the angular span θ340 of each of the proximal passage 342 and the distal passage 344 is significantly greater than 180°. As a result, even the maximum possible relative rotation of the outside plug 320 and stem 330 that can be achieved by rotating the handles 116, 126 in opposite directions is insufficient to move the driver 304 into engagement with the opposite ramp 347, 349 in a manner that would cause the lock to transition states. This clearance provided by the cam track 340 also prevents damage that may otherwise occur if the torque loads were transmitted to the keycam assembly 300.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A keycam assembly, comprising:

a first shell;

a first plug rotatably seated in the first shell, the first plug defining an aperture;

a stem having a proximal end portion and a distal end portion opposite the proximal end portion, wherein the proximal end portion is rotatably seated in the first plug;

a cam track defined at least in part by the stem;

a ridge defined at least in part by the stem, wherein the cam track extends about the ridge; and a cam driver extending between the cam track and the aperture, wherein the cam driver is operable to travel around the ridge along the cam track.

2. The keycam assembly of claim 1, further comprising a lock control lug mounted to the stem; and wherein the lock control lug extends into a lock control opening defined by the first shell.

3. The keycam assembly of claim 1, wherein the stem extends along a longitudinal axis defining a proximal direction and an opposite distal direction; and wherein the cam track comprises:

a proximal passage;

a distal passage;

a first ramped passage connecting the proximal passage with the distal passage; and a second ramped passage connecting the proximal passage with the distal passage.

4. The keycam assembly of claim 3, wherein each of the proximal passage and the distal passage extends circumferentially about a portion of the stem.

5. The keycam assembly of claim 3, wherein each of the first ramped passage and the second ramped passage extends helically about a portion of the stem.

6. The keycam assembly of claim 1, wherein the cam driver is spherical.

7. The keycam assembly of claim 1, further comprising:

a second shell offset from the first shell; and a second plug offset from the first plug and rotatably seated in the second shell; and wherein the distal end portion of the stem is slidably coupled with the second plug.

8. A lockset comprising the keycam assembly of claim 1, wherein the lockset has a locked state and an unlocked state;

wherein, with the lockset in the locked state, the stem has a first longitudinal position; and wherein, with the lockset in the unlocked state, the stem has a second longitudinal position offset from the first longitudinal position.

9. A keycam assembly, comprising:

a stem extending along a longitudinal axis;

a ridge defined at least in part by the stem;

a cam track defined at least in part by the stem, the cam track surrounding extends about the ridge; and a cam driver movably seated in the cam track such that the cam driver is operable to travel around the ridge, a cam driver extending between the cam track and the aperture, wherein the cam driver is operable to travel around the ridge along the cam track.

10. The keycam assembly of claim 9, further comprising:

a first shell defining a lock control opening;

a first plug rotatably seated in the first shell, wherein a first end portion of the stem is rotatably seated in the first plug; and a lock control lug mounted to the stem and extending into the lock control opening.

11. The keycam assembly of claim 10, wherein each of the cam track and the ridge is defined at least in part by the first end portion of the stem.

12. The keycam assembly of claim 9, wherein the longitudinal axis defines a proximal direction and a distal direction opposite the proximal direction; and wherein the cam track comprises:

a proximal passage;

a distal passage;

a first ramped passage connecting the proximal passage with the distal passage; and a second ramped passage connecting the proximal passage with the distal passage.

13. The keycam assembly of claim 12, wherein the proximal passage includes a proximal passage first end portion and a proximal passage second end portion;

wherein the distal passage includes a distal passage first end portion and a distal passage second end portion;

wherein the first ramped passage connects the proximal passage first end portion with the distal passage first end portion; and wherein the second ramped passage connects the proximal passage second end portion with the distal passage second end portion.

14. A lockset comprising the keycam assembly of claim 9, wherein the lockset has a locked state in which the stem occupies a first longitudinal position; and wherein the lockset has an unlocked state in which the stem occupies a second longitudinal position offset from the first longitudinal position.

15. The keycam assembly of claim 9, wherein the cam driver is spherical.

16. A lockset, comprising:

a first plug rotatably mounted in the lockset, the first plug comprising an aperture;

a stem extending along a longitudinal axis, the stem having a first longitudinal position defining a locked state of the lockset, the stem having a second longitudinal position defining an unlocked state of the lockset, wherein a first end portion of the stem is rotatably seated in the first plug and defines a ridge and a cam track extending about the ridge; and a cam driver seated in the cam track and extending into the aperture; and wherein relative rotation of the first plug and the stem causes the cam driver to travel within the cam track to thereby longitudinally shift the stem relative to the first plug.

17. The lockset of claim 16, further comprising a second plug rotatably mounted in the lockset and longitudinally offset from the first plug;

wherein the stem further comprises a second end portion opposite the first end portion; and wherein the second end portion of the stem is slidably coupled with the second plug.

18. The lockset of claim 16, further comprising:

a first shell defining a lock control opening comprising a locking portion and an unlocking portion, wherein the first plug is rotatably seated in the first shell; and a lock control lug including an arm extending into the lock control opening, the lock control lug having a locking position in which the arm is received in the locking portion, the lock control lug having an unlocking position in which the arm is received in the unlocking portion; and wherein the stem is configured to move the lock control lug between the locking position and the unlocking position as the stem moves between the first longitudinal position and the second longitudinal position.

19. The lockset of claim 16, wherein the cam driver is spherical.

* * * * *